UNITED STATES PATENT OFFICE.

WILHELM SCHUMACHER, OF OSNABRÜCK, GERMANY, ASSIGNOR TO ERNST THALMANN, OF NEW YORK, N. Y.

PRODUCTION OF COHERENT BODIES FROM COMMINUTED SUBSTANCES.

No. 855,419.     Specification of Letters Patent.     Patented May 28, 1907.

Original application filed September 16, 1904, Serial No. 224,717. Divided and this application filed February 20, 1907. Serial No. 368,491.

*To all whom it may concern:*

Be it known that I, WILHELM SCHUMACHER, a subject of the Emperor of Germany, and a resident of Osnabrück, Prussia, Germany, have invented certain new and useful Improvements in the Production of Coherent Bodies from Comminuted Substances, of which the following is a specification.

My invention relates to the production of coherent bodies from pulverized ores, blast furnace dust, and the like, thereby bringing such substances into more convenient form for shipping and treatment.

My present invention relates particularly to an efficient way of binding the comminuted substances together with the aid of calcium silicate, whether used alone or with the addition of lime, and involves treatment of the comminuted substances together with the binder by means of steam under pressure.

The present application is a division of one filed by me in the United States Patent Office on September 16th 1904, Serial No. 224,717.

I obtain calcium silicate in any suitable manner, for instance by burning or melting together its components (silica or quartz and lime) or by precipitating it from a solution, as by means of calcium chlorid from water-glass (silicate of soda). This calcium silicate I grind very finely, and mix it with the comminuted substance such as fine ores or blast furnace dust, taking care to have a proper amount of moisture. The proportion of calcium silicate should be as low as possible, and in most cases the calcium silicate need not be more than five per cent of the substance to be agglomerated. I may use the calcium silicate alone, or I may add some lime (hydrate of lime) this being the preferred procedure. It is desirable to have the raw materials, such as quartz and lime, from which the calcium silicate is prepared, as pure as possible, as this increases the binding power of the calcium silicate. The calcium silicate with or without the addition of lime having been thoroughly mixed with the ore or other comminuted substance, the mass, after having been formed into suitable lumps or briquets, is brought into a closed vessel in which it is subjected to the action of steam under pressure. This converts the calcium silicate into an efficient binder (collodial calcium silicate), and after removal from the vessel the lumps or briquets are found to be sufficiently hard and resistant to stand the strain to which they may be subjected during shipment and treatment, say in a furnace, without premature crumbling.

I claim as my invention:

1. The herein described process for the production of coherent bodies from fine ores, blast furnace dust and the like, which consists in subjecting a mixture of finely divided calcium silicate with the substance to be agglomerated, to the action of steam under pressure.

2. The herein described process for the production of coherent bodies from fine ores, blast furnace dust and the like, which consists in subjecting a mixture of finely divided calcium silicate and lime with the substance to be agglomerated, to the action of steam under pressure.

In testimony whereof I have hereunto subscribed my name in the presence of two subscribing witnesses.

WILHELM SCHUMACHER.

Witnesses:
PAUL R. THOMPSON,
JAMES M. BOWCOCK.